Dec. 30, 1958  H. E. TEMPLE  2,866,565
PROOFER CONTROL SYSTEM
Filed April 2, 1957  5 Sheets-Sheet 1

Fig. 1

INVENTOR.
Hiram E. Temple
BY
Otto Moeller
Attorney

Dec. 30, 1958

H. E. TEMPLE 2,866,565

PROOFER CONTROL SYSTEM

Filed April 2, 1957

INVENTOR.
Hiram E. Temple
BY
Otto Moeller
Attorney

Dec. 30, 1958     H. E. TEMPLE     2,866,565
PROOFER CONTROL SYSTEM Filed April 2, 1957     5 Sheets-Sheet 4

INVENTOR.
Hiram E. Temple
BY
Otto Mueller
Attorney

Dec. 30, 1958      H. E. TEMPLE      2,866,565
PROOFER CONTROL SYSTEM Filed April 2, 1957      5 Sheets-Sheet 5

Fig.9

INVENTOR.
Hiram E. Temple
BY
Otto Moeller
Attorney

United States Patent Office 2,866,565
Patented Dec. 30, 1958

2,866,565

PROOFER CONTROL SYSTEM

Hiram E. Temple, York, Pa., assignor to Capitol Products Corporation, Mechanicsburg, Pa., a corporation of Pennsylvania Application April 2, 1957, Serial No. 650,153

12 Claims. (Cl. 214—16.4)

This invention relates to a continuous dough proofer of the type in which pans of dough to be proofed are disposed on the shelves of racks, which racks are movable in a closed loop through the proofing chamber.

The pans of dough carried by the racks, as the racks travel through the proofing chamber, are subjected to proofing conditions of temperature and relative humidity. For different doughs in the production of different kinds of bread the proof time will vary and it is important to maintain close control of the proof time, so that the dough is not under or over proofed and uniformity of product is insured.

The proofer herein described, and as more fully described in my copending application Serial No. 518,770, filed June 29, 1955, now Patent No. 2,823,811, of which the present application is a continuation in part, is adapted to be charged with a run of dough requiring a different proof time than a preceding run of dough while dough of the preceding run is still in the proofing chamber, with each run of dough receiving its required proof time. For example, assuming the closed rack transporting loop of the proofing chamber is provided with its full complement of racks and the proofer has been charged with a run of slow proof time dough. It is now desired to transport a run of fast proof time dough through the proofing chamber while racks of slow proof time dough are still in the proofer. This is accomplished by permitting one or more empty racks to pass by the charging or loading station before loading the fast proof time dough, and then, at a station remote from the loading station, withdrawing one or more of the empty racks from the closed rack transporting loop, means being provided along the path of the loop leading back to the loading and unloading station for accelerating the speed of the racks of fast proof time dough through the vacancy formed by the withdrawal of the said one or more empty racks. Thus the racks of fast proof time dough complete the circuit through the proofing chamber in a shorter period of time resulting in a shorter proof time. This shortened proof time may be varied depending on the number of racks withdrawn.

An important feature and object of the present invention to provide means for detecting and indicating empty racks, in other words racks free of pans, as said empty racks pass from the loading station.

A further object is to provide such detecting and indicating means disposed exteriorly of the proofer for tracing the progress of said empty rack or racks through the proofing chamber from the pan loading station to the rack withdrawal station whereby the operator may be continuously apprised of the location of said empty rack or racks, so that one or more empty racks, as desired, may be diverted from the closed rack transporting loop, when said empty rack or racks reach the rack withdrawal station.

Conversely, a proofing operation conducted with less than a full complement of racks in the closed transporting loop, in other words, with one or more of the racks withdrawn from the transporting loop, may be followed by a proofing operation requiring a greater proof time by inserting one or more of the withdrawn racks into the closed rack transporting loop between the last rack of lesser proof time dough and the first rack of greater proof time dough. The break between the racks of lesser and greater proof time doughs being defined by permitting one or more empty racks to pass the loading station between the last of the lesser and the first of the greater proof time doughs. The invention thus contemplates detecting and indicating means, as above described, continuously apprising the operator of the location of said empty rack or racks, whereby one or more of the diverted racks may be reinserted into the closed transporting loop when the indicated empty rack or racks reach the withdrawn rack station, thus insuring reinsertion of the rack or racks after the last rack of fast proof time dough.

The means for diverting or withdrawing racks from the closed transporting loop includes a power driven conveyor arranged when operated in one direction to engage a rack at the rack diverting station for withdrawing it from the said closed loop. An important feature and object of the invention is to provide a control system including selector means exterior of the proofer under the control of the operator for automatically energizing said power driven conveyor for withdrawing one or more preselected empty racks from the closed transporting loop irrespective of the position of said one or more racks in the closed loop between the loading station and the diverting station, when such rack or racks reach the rack withdrawing conveyor. A further object is to provide a similar control system for operating the diverting conveyor in the opposite direction for re-introducing withdrawn racks into the closed loop to follow any desired empty rack.

More specifically the invention provides a rotatable disc having a circular row of indicating means, the disc rotating in timed relation with the travel of racks from the loading station to the rack diverting and rack re-inserting station and the indicating means being constituted to detect and indicate empty racks as they pass from the loading station, whereby the indicating means traces the progress of empty racks through the proofing chamber from the loading station to the rack diverting and rack re-inserting conveyor. Two circular rows of manually movable selector members concentric with the circular row of indicating means are also carried by the rotatable disc, the individual selector members of said rows being in radial alinement with respective individual indicating means. Manually moved selector members of one of said rows are arranged to engage control means for operating the conveyor in a direction to withdraw racks from the closed loop and manually moved selector members of the other of said rows are arranged to engage control means for operating the conveyor in a direction to re-insert racks into the closed loop, the control means being located with respect to the rotating disc so as to be engaged by a moved selector member when the rack corresponding to the moved selector member reaches the conveyor. Thus irrespective of the position of an empty rack in the closed loop between the loading means and the rack diverting and re-inserting conveyor, the operator is apprised of the position of the empty rack by observing the indicating means on the rotating disc. Then by manually moving a selector member in radial alinement with the empty rack indicator, the empty rack is automatically diverted or a rack is automatically reinserted, depending on whether the selector member moved is in one or the other of the two circular rows of selector members. Suitable means, such as cam means, is provided for returning the manually moved selector member and the indicating means to their original position, after the moved selector member has performed its function of initiating the operation of the rack withdrawing and reinserting conveyor. The conveyor is arranged to be automatically stopped upon moving the necessary distance to divert or reinsert a rack.

Other objects and advantages reside in certain novel features of construction, arrangement and combination of parts which will be hereinafter more fully described, reference being had to the accompanying drawings showing an exemplary embodiment of the invention. Referring to the drawings:

Figure 1:
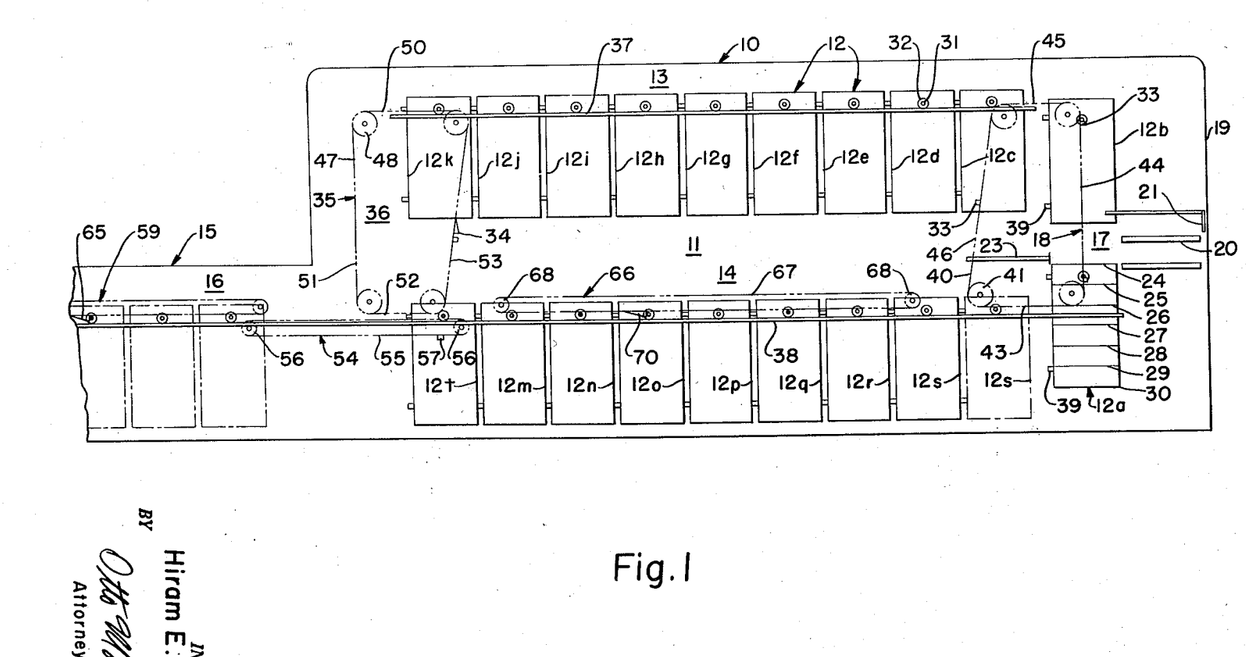
Figure 1 is a side elevation, partially diagrammatic, inside the proofer housing of the rack proofer mechanism.

Referring particularly to Figure 1, the proofer comprises a generally rectangular elongated housing 10 defining a proofing chamber 11 through which racks 12, carrying pans of dough to be proofed, travel in an elongated closed loop having an upper horizontal run 13 and a lower horizontal run 14, and comprises also a smaller generally rectanguar housing 15 at one end of the housing 10, which end will be referred to as the rearward end of the proofer. The housing 15 defines a rack accommodating chamber 16, which chamber 16 communicates with proofing chamber 11 and is adapted to receive a number of racks 12 withdrawn from the lower run 14 of the closed loop, as and for the reasons hereinafter described.

The housings 10 and 15 are preferably formed of sheet metal panels supported by suitable skeleton framework, and air under such temperature and relative humidity suitable for the proofing of the dough is supplied to the proofing chamber 11 by suitable air conditioning means, not shown.

The racks 12 are of generally conventional design, being in the nature of an open rectangular framework having a plurality of vertically spaced horizontal shelves, all made up of metal bars, tubing or the like, the shelves being adapted to support a plurality of pan sets.

The forward end of the proofing chamber 11 is arranged to provide a loading and unloading station 17, at which station pan sets of dough to be proofed are loaded onto the shelves of the racks 12 and pan sets of dough that have been proofed are unloaded from the shelves of the racks 12.

A rack elevator, indicated generally by reference numeral 18, raises successive racks 12 through the unloading and loading station 17 from the lower horizontal run 14 to the upper horizontal run 13.

A pair of horizontal vertically spaced conveyors extend transversely of the proofer housing 10 through a suitable opening, not shown, in a side wall thereof into the loading and unloading station 17 between rack elevator 18 and the front wall 19 of the proofer housing 10, so that the shelves of the racks 12 can be successively brought into register with the conveyor as the racks 12 are elevated through the unloading and loading station 17. These conveyors may be of any suitable type for conveyance of bread pan sets, for example, powered roll conveyors.

The upper conveyor 20, hereinafter referred to as the loading conveyor, is operated by motor $M_6$ through appropriate drive means 120 and conveys the pan sets of dough into the proofer to a position in front of a rack being elevated by the elevator 18, where reciprocating pusher means, hereinafter referred to as the loading pusher 21, pushes successive groups of pan sets from the loading conveyor 20 onto successive shelves of a rack 12 as the latter is intermittently elevated through the loading and unloading station 17. The loading pusher 21 is operated by motor $M_4$ through appropriate drive means 210. The lower conveyor 22, hereinafter referred to as the unloading conveyor, is operated by motor $M_2$ and is adapted to convey pan sets of proofed dough from the proofer, successive groups of pan sets being pushed from successive shelves of a rack 12 in the loading and unloading station 17 by reciprocating pusher means, hereinafter referred to as the unloading pusher 23. The unloading pusher 23 is operated by motor $M_3$ through appropriate drive means 230.

Figure 2:
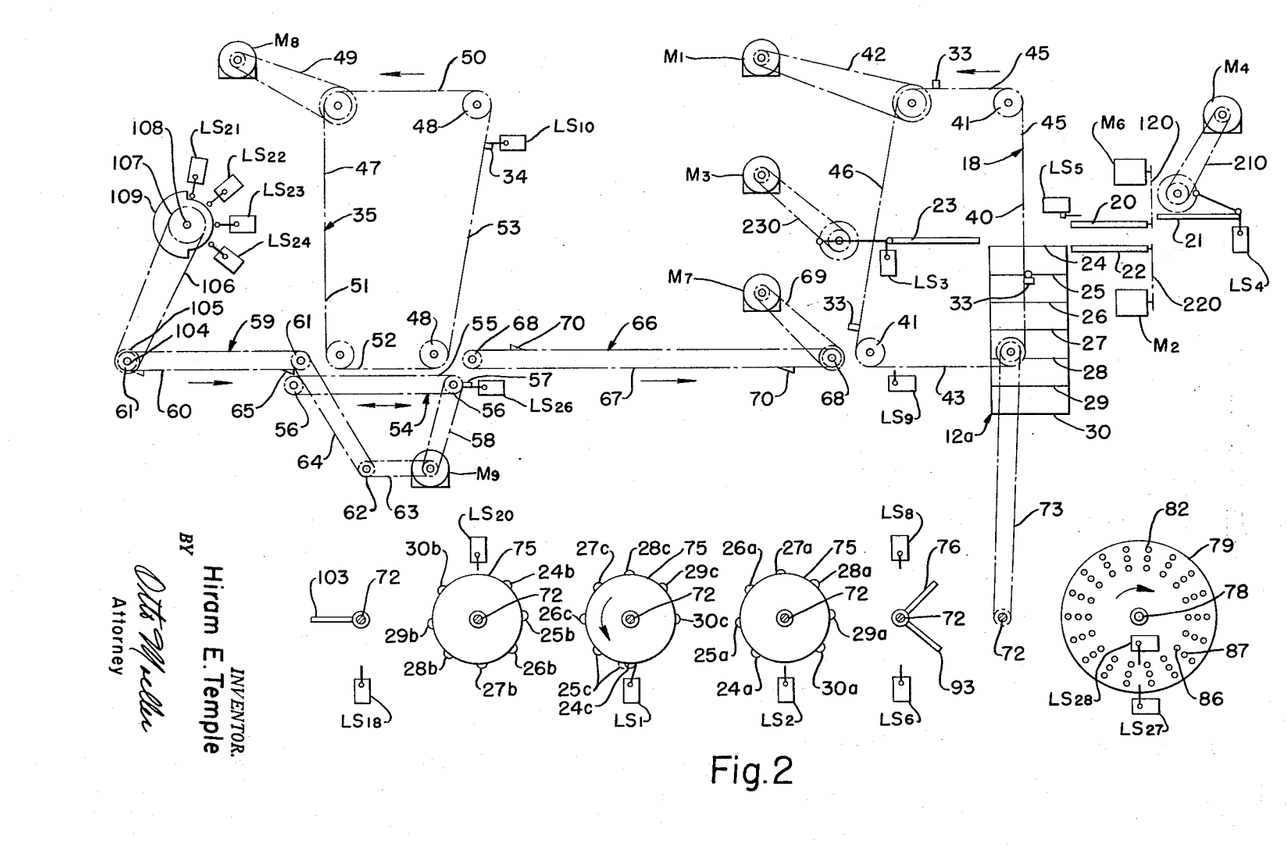
Figure 2 is a diagrammatic view of the rack proofer mechanism and control means therefor.

The racks 12 are all identical in construction, so that in describing any one particular rack it will be understood that the other racks are similarly constructed. Referring particularly to Figures 1 and 2, rack 12a is shown as having seven shelves, the shelves being designated by the reference numerals 24 to 30. While for purpose of illustration the racks 12 are shown with seven shelves and the operation of the apparatus is described hereinafter in respect to racks with seven shelves, it will become apparent that the apparatus is readily adaptable to handle racks with a lesser or greater number of shelves.

As illustrative of all the racks 12, rack 12d is provided at each end with a laterally outwardly extending stub shaft 31 carrying a roller 32. The stub shafts 31 and rollers 32 carried thereby are disposed above the center of gravity of the rack 12d and located centrally between the sides of the rack. Extensions of the stub shafts 31 projecting beyond the rollers 32 are engaged by lug means 33 of the elevating means 18 in transporting successive racks 12 from lower run 14 to upper run 13; and are also engaged by latch and lug means 34 of a lowering means, hereinafter referred to as the lowerator, designated generally by the reference numeral 35, in transporting successive racks from upper run 13 through the rack lowering station 36 to lower run 14.

At opposite sides of the proofing chamber 11 and extending longitudinally along upper run 13 and lower run 14, are tracks 37 and 38, arranged to be engaged by the rollers 32 whereby the tracks 37 and 38 provide guide supports along which the rollers 32 are adapted to roll in moving the racks 12 along the upper and lower runs 13 and 14.

Each of the racks 12 is provided with longitudinally projecting lugs 39 arranged to engage an adjacent rack to provide suitable spacing between adjacent racks 12 as they are moved along the upper and lower tracks 37 and 38 of upper and lower runs 13 and 14, respectively.

The elevator 18, which, as previously stated, raises the racks 12 from the lower run 14 to the upper run 13, includes endless chain means 40 trained over sprockets 41, arranged to be operated by motor $M_1$ through appropriate chain and sprocket means 42. The sprockets 41 and endless chain means 40 entrained thereover, referring particularly to Figure 1, are arranged to provide a horizontal forwardly traveling run 43 for moving a rack 12 along the forward end portion of lower tracks 38 into the loading and unloading station 17; a vertical ascending run 44 for raising a rack 12 through the loading and unloading station 17; a horizontal rearwardly traveling run 45 for moving a rack 12 from the loading and unloading station 17 onto the end of upper tracks 37; and a descending slightly rearwardly sloping return run 46.

Referring to Figure 1, as the rack 12a is moved upwardly by the elevator 18 through the unloading and loading station 17, rack 12b is moved along run 45 onto upper tracks 37 where it will engage and push rack 12c ahead of it and consequently all the racks in upper run 13 will be pushed along the upper tracks 37. When rack 12b reaches the position occupied by rack 12c, it will remain there by reason of disengagement of the lug means 33 from rack stub shafts 31 as the lug means 33 moves downwardly to descending run 46. As the rack 12b is being pushed in the manner described, rack 12k will be moved by lowerator 35 through rack lowering station 36 into the position occupied by rack 12t, and the racks 12t to 12s will be moved ahead so that rack 12s will be moved to the position shown in phantom. The rack 12s will then be in position to be engaged by another set of lug means 33 and to be moved by the elevator 18 into and through the unloading and loading station 17.

The lowerator 35 includes endless chain means 47 trained over sporckets 48, arranged to be operated by motor $M_8$ through appropriate chain and sprocket means 49. The sprockets 48 and endless chain means 47 entrained thereover, referring particularly to Figure 1, are arranged to provide a horizontal rearwardly traveling run 50 for moving a rack 12 rearwardly from the position occupied by rack 12k off the upper tracks 37; a vertical descending run 51 for lowering a rack through the rack lowering station 36; a horizontal forwardly traveling run 52 for moving a rack forwardly along lower tracks 38; and an ascending slightly forwardly sloping return run 53. The racks 12 are moved along the runs 50, 51 and 52 by engagement of the lug and latch means 34 with the rack stub shafts 31.

When a slow proof time dough is followed by a faster proof time dough, as later described in detail, or when it is desired to inspect, repair or replace a rack, the invention provides means for moving one or more empty racks into storage chamber 16, from which chamber the racks can be conveniently withdrawn through suitable doors at the end of the housing 15. This includes an endless diverting conveying means 54. By remote control means, hereinafter described, the conveying means 54 is automatically rendered operative to move one, two, three or four racks occupying any of the positions of racks 12b to 12k, into storage chamber 16 upon reaching the position shown occupied by rack 12t in Figure 1.

The conveying means 54 includes endless chain means 55 trained around tandem arranged sprockets 56 and extends along the outer sides of the lower tracks 38, which tracks extend through the rack lowering station 36 into the storage chamber 16. The conveying means 54 is disposed with its top run below the lower run 52 of the rack lowerator 35 and extends rearwardly a short distance into rack storage chamber 16. Outwardly projecting lug means 57, carried by the conveying means 54, when moving toward the left, as viewed in Figure 1, along the top run, engages the stub shafts 31 of a rack occupying the position of rack 12t, moving the rack rearwardly into the storage chamber 16 along the tracks 38.

The diverting conveying means 54 is driven from a motor $M_9$ through appropriate chain and sprocket means 58. The motor $M_9$ is a reversible motor and is arranged, as later explained, to reverse the direction of travel of the conveying means 54, so that the lug means 57 when moving toward the right, as viewed in Figure 1, along the top run, will move a rack forwardly from the storage chamber 16 into the closed loop of the proofing chamber 11.

In storage chamber 16 there is provided a rear endless conveying means 59 for moving racks 12 ahead to successively occupy a position where they can be picked up by the diverting conveying means 54 and re-introduced, as previously described, into the closed loop of the proofing chamber 11. By control means hereinafter described, a predetermined number of racks 12 are adapted to be moved from the storage chamber 16 into the closed loop to follow any rack 12 of the upper row of racks in the proofing chamber when that particular rack reaches the position occupied by rack 12t in Figure 1.

The rear conveying means 59 includes endless chain means 60 trained around tandem arranged sprockets 61, and is disposed in a plane above the plane of the diverting conveying means 54. The forward end of the rear conveying means 59 overlaps the rearward end of the diverting conveying means 54 and extends to the rear of the chamber 16. The motor $M_9$ is arranged to operate the rear conveying means 59 through a conventional air operated electrically controlled spiral jaw clutch 62 and appropriate chain and sprocket means 63 and 64. As later described in detail, the clutch 62 is engaged for power actuation of the rear conveying means 59 in counterclockwise direction, only when the reversible motor $M_9$ is operating in a direction to move the diverting conveying means 54 in a clockwise direction. At such time lug means 65 carried by the lower run of rear conveying means 59 engages the rack stub shafts 31, and in moving from its dotted line position to its full line position, Figure 2, successive racks 12 are pushed forwardly to a position where they are engaged by the lug means 57 of the diverting conveying means 54 and re-introduced into the closed loop. When the diverting conveying means 54 operates in a direction to push racks 12 into the chamber 16, the clutch 62 is arranged to be disengaged, so that the lug means 65 is moved back from its full line position to its dotted line position by the pressure of the racks 12 moving into the chamber 16.

Extending along the lower run 14 above the level of the tracks 38 is a forward conveying means 66. The forward conveying means 66 includes endless chain means 67 trained around tandem arranged sprockets 68 and is arranged to be driven in counterclockwise direction by motor $M_7$ through appropriate chain and sprocket means 69. A plurality of lug means 70 carried by the endless chain means 67 are arranged when traveling along the lower run of the chain means 67 to engage the rack stub shafts 31 to move the racks ahead along the lower run 14 of the proofing chamber. Thus, if one or more racks have been diverted into the chamber 16, the forward conveying means 66 will move racks through the spaces vacated by the diverted racks, so that there will be a rack in the position of rack 12s shown in phantom in Figure 1, ready to be picked up by the lug means 33 of the elevating means 18. The control means for operating the forward conveying means 66 will be described hereinafter.

Before describing the operation of the proofer and the control means therefor, it is pointed out that the shelves 24 to 30 of the racks 12 are spaced apart a greater distance than are the loading conveyor 20 and unloading conveyor 22, and for purpose of illustration, it will be assumed in the following description that the shelves are spaced nine inches apart and the loading and unloading conveyors eight inches apart.

*Operation*

Figure 8:
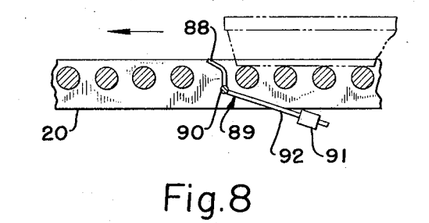
Figure 8 is a sectional view on the line 8—8 of Figure 5.

The operation of the proofer will now be described with particular reference to the wiring diagram, Figure 8, and it will be assumed it is operating with a full complement of racks in the closed loop, in other words slow proof time dough is being run through the proofer. Assume further, as a specific example, that a proof time of 66½ minutes is desired. There being 19 racks in the proofer, this means that every 3½ minutes a rack must move from the position shown occupied by rack 12a in Figure 1 through its unloading and loading cycle to the position shown occupied by rack 12b. Since there are 7 shelves to a rack, a cycle of events must occur every 30 seconds during this 3½ minute period, which cycle is controlled by a pulse timer 71 which periodically and momentarily closes timer switch TS in the unloading pusher motor circuit.

Upon such momentary closing of switch TS, a circuit is completed through switch TS, a contact $C_2$ of limit switch $LS_1$ ($LS_1C_2$) to energize motor $M_3$ starter coil control relay ($M_3R$) thereby closing a circuit for operating unloading pusher motor $M_3$. Initial movement of the unloading pusher 23 to the right, as viewed in Figure 2, cut of engagement with limit switch $LS_3$, causes:

(1) Contact $C_2$ of limit switch $LS_3$ ($LS_3C_2$) to close, whereby the circuit to motor $M_3$ control relay ($M_3R$) is maintained upon reopening of time switch TS;

(2) Contact $C_3$ of limit switch $LS_3$ ($LS_3C_3$) to close, whereby a circuit through $LS_3C_2$ and $LS_3C_3$ to mechanically held relay $MHR_1$ is closed, which upon energization functions through one contact to prepare the circuit for operation of the elevator at the appropriate time by closing switch $MHR_1S_1$, through a second contact to open switch $MHR_1S_2$, and through a third contact to close switch $MHR_1S_3$; and (3) Contact $C_1$ of limit switch $LS_3$ ($LS_3C_1$) to open, whereby even though switch $MHR_1S_1$ is closed, the circuit to the elevator motor control relay $M_1R$ remains open to prevent operation of the elevator until the unloading pusher 23 has completed its extended and return stroke.

Energization of motor $M_3$ control relay ($M_3R$) to start the unloading pusher motor $M_3$, as described above, simultaneously opens the normally closed switch $M_3RS_1$, thereby breaking the circuit to motor $M_2$ control relay ($M_2R$) which upon de-energization opens a circuit to the unloading conveyor motor $M_2$. Thus, the unloading conveyor 22 is inoperative while the unloading pusher 23 is operating to push pans of proofed dough from the shelf 24 of rack 12a onto the unloading conveyor 22.

At the end of the return stroke of the unloading pusher 23, it re-engages limit switch $LS_3$, whereupon—

(1) Contact $C_2$ of limit switch $LS_3$ ($LS_3C_2$) will again open to break the circuit to motor $M_3$ control relay ($M_3R$), causing unloading pusher motor $M_3$ to stop;

(2) Contact $C_3$ of limit switch $LS_3$ ($LS_3C_3$) will again open, however, since MHR, is a mechanically held relay, the switches $MHR_1S_1$, $MHR_1S_2$ and $MHR_1S_3$ controlled thereby, will remain in their previously noted positions; and (3) Contact $C_1$ of limit switch $LS_3$ ($LS_3C_1$) will again close, completing a circuit through $LS_3C_1$, $LS_4C_1$, $MHR_1S_1$ and $LS_2C_1$ to energize motor $M_1$ control relay ($M_1R$) for initiating operation of elevator motor $M_1$ to raise the rack 12a.

De-energization of motor $M_3$ control relay ($M_3R$) to stop the unloading pusher motor $M_3$, as described above, simultaneously effects re-closing of switch $M_3RS_1$ to complete the circuit to motor $M_2$ control relay ($M_2R$) which upon energization closes a circuit to the unloading conveyor Motor $M_2$. Thus the pans of proofed dough that have been pushed by the unloading pusher 23 from shelf 24 of rack 12a onto unloading conveyor 22, are now conveyed out of the proofer.

Figure 3:
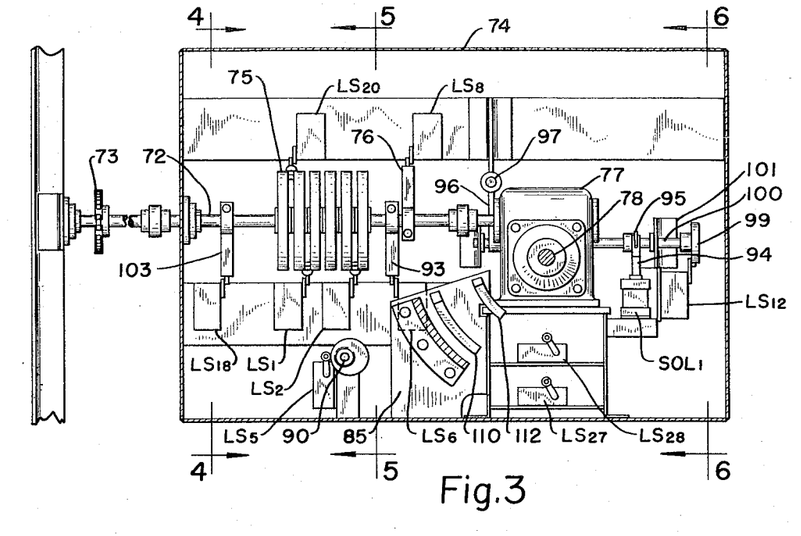
Figure 3 is a sectional view through the control box with the control means shown therein in elevation.
Figure 4:
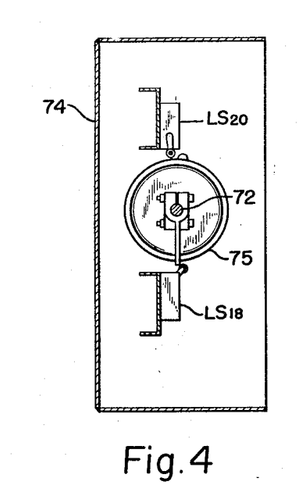
Figure 4 is a sectional view taken on the line 4—4 of Figure 3.
Figure 5:
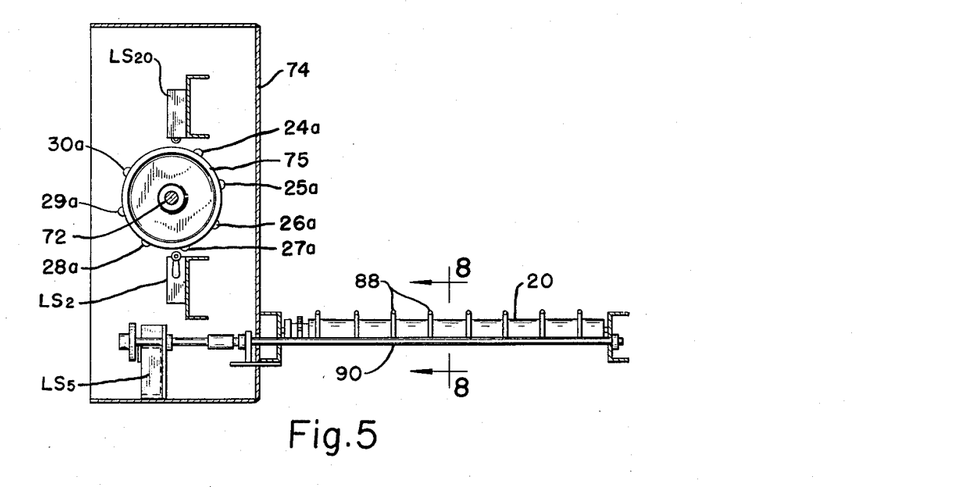
Figure 5 is a sectional view taken on the line 5—5 of Figure 3.

Operation of the elevator 18, as just described, controls the operation of various elements of the proofer as hereinafter revealed. For this purpose a timer shaft 72 is operatively connected with the elevator 18 through sprocket and chain means 73, as shown in Figure 2. Referring to Figure 3, the timer shaft 72 extends into and is rotatably mounted in a control panel box 74, which may be mounted in any suitable location, as on the front wall 19 of the proofer housing 10.

Mounted on the timer shaft 72 for rotation therewith is a drum 75 which is provided with a series of knobs 24a to 30a which are spaced apart circumferentially of the drum equal distances proportional to the spacing between the shelves of the racks 12. The distance between knob 30a and knob 24a is greater than the distance between the other knobs, since this greater spacing represents and is proportional to the distance between the last shelf of one rack and the first shelf of the next rack when on the ascending run 44 of the elevator 18, as for example the last shelf of rack 12b and shelf 24 of rack 12a in Figure 1.

Now, when shelf 24 of rack 12a has moved up eight inches, in other words from a position registering with unloading conveyor 22 to a position registering with loading conveyor 20, the drum 75 has rotated to move knob 24a a proportional distance, at which point it engages a limit switch $LS_2$. Upon such engagement of knob 24a with limit switch $LS_2$, referring to Figure 9:

(1) Contact $C_1$ of limit switch $LS_2$ ($LS_2C_1$) opens, thereby breaking the previously established circuit to elevator motor $M_1$ control relay $M_1R$ to stop the elevator motor $M_1$ with the shelf 24 in registration with loading conveyor 20; and (2) Contact $C_2$ of limit switch $LS_2$ ($LS_2C_2$) closes, completing a circuit through switch $MHR_1S_3$ (which at this time is closed) and $LS_2C_2$, to energize loading pusher motor relay $M_4R$, thereby effecting operation of loading pusher motor $M_4$ and causing loading pusher 21 to push a rank of pan straps onto shelf 24 of rack 12a.

At the same time that knobs 24a—30a are moved upon rotation of drum 75, a second series of knobs 24b—30b on the drum 75 are moved a like distance, at which point knob 24b engages and opens a limit switch $LS_{20}$, thereby breaking the circuit to the loading conveyor motor control relay $M_6R$ to stop loading conveyor motor $M_6$, whereby during the operation of the loading pusher 21, the loading conveyor 20 remains at rest.

At the same time that knobs 24a—30a and 24b—30b are moved upon rotation of drum 75, a third series of knobs 24c—30c on the drum 75 are moved a like distance. Hence, since the distance between knobs 24c and 25c represents the distance between shelves 24 and 25 of rack 12a, or nine inches, and since the elevator 18 has only moved through a distance of eight inches, the distance between the loading conveyor 20 and the unloading conveyor 22, then knob 25c will stop the equivalent of one inch short of a limit switch $LS_1$, in the dotted line position as shown in Figure 2.

Initial rotation of drum 75, causes its knob 24c to ride off limit switch $LS_1$, whereupon one of its contacts $LS_1C_1$ will close and its other contact $LS_1C_2$ will open. Thus, with $LS_1C_2$ open, unloading pusher 23 cannot again start to operate until knob 25c engages limit switch $LS_1$, or in other words, until shelf 25 of rack 12a has moved up another inch to register with unloading conveyor 22, thereby preventing a cycle of events from occurring even though timer switch TS be closed by reason of the pulse timer 71 being set for a period of time less than that required for completion of a cycle of events.

Figure 9:
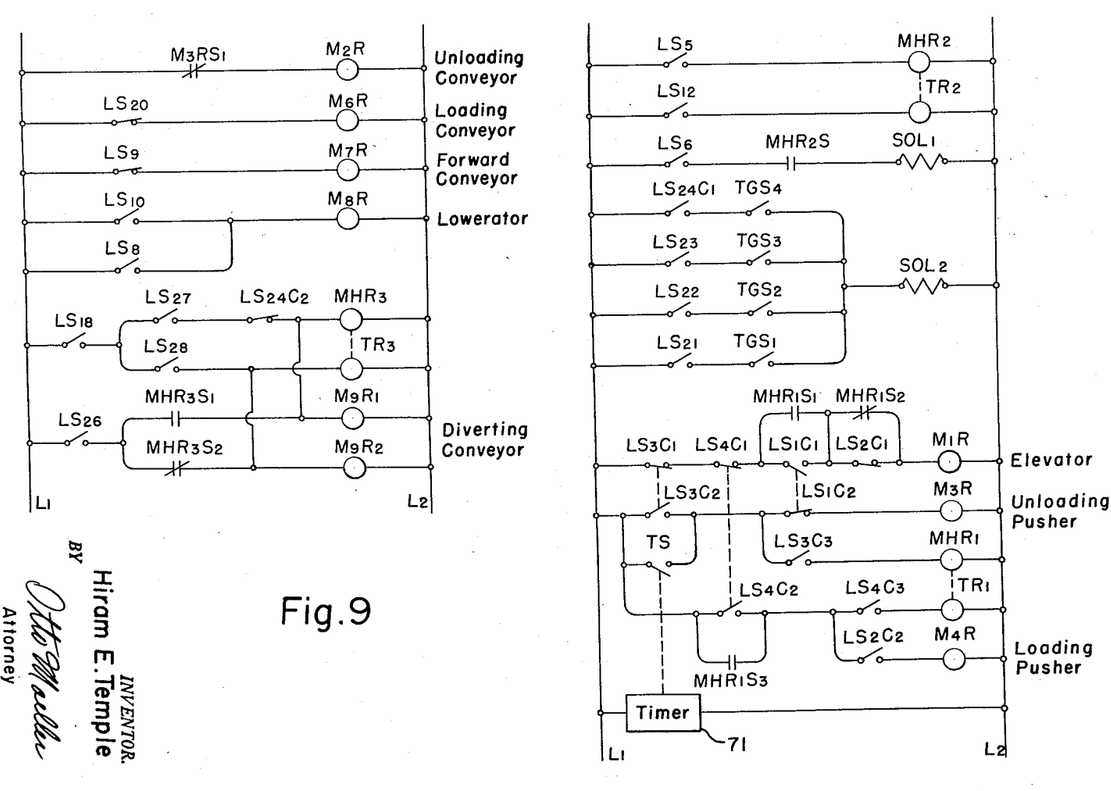
Figure 9 is a circuit diagram showing the electrical circuit of the control system.

As soon as loading pusher 21 moves from its retracted position, as shown in Figure 2, to push a group of pan sets from loading conveyor 20 onto shelf 24 of rack 12a, which shelf is now in register with loading conveyor 20, it is disengaged from limit switch $LS_4$, whereupon, referring to Figure 9:

(1) Contact $C_3$ of limit switch $LS_4$ ($LS_4C_3$) closes to complete a circuit through $MHR_1S_3$ (which at that time is closed) and $LS_4C_3$ to energize trip relay TR thereby releasing the trip of mechanically held relay $MHR_1$. Upon release of mechanically held relay $MHR_1$, it effects through one contact re-closing of switch $MHR_1S_2$ to prepare the circuit for operation of the elevator 18 at the appropriate time; through a second contact it effects re-opening of switch $MHR_1S_1$; and through a third contact it effects re-opening of switch $MHR_1S_3$;

(2) Contact $C_2$ of limit switch $LS_4$ ($LS_4C_2$) closes whereby the circuit to loading pusher motor control relay $M_4R$ is maintained upon re-opening of switch $MHR_1S_3$, so that loading pusher 21 continues to operate through its extended and returrn stroke; and (3) Contact $C_1$ of limit switch $LS_4$ ($LS_4C_1$) opens, so that even though switch $MHR_1S_2$ is closed, the circuit to the elevator motor control relay $M_1R$ remains open to prevent operation of the elevator 18 until the loading pusher 21 has completed its extended and return stroke.

At the end of its return stroke, loading pusher 21 re-engages limit switch $LS_4$, whereupon:

(1) Contacts $C_2$ of limit switch $LS_4$ ($LS_4C_2$) will again open to break the circuit to loading pusher motor control relay $M_4R$, causing loading pusher motor $M_4$ to stop;

(2) Contact $C_3$ of limit switch $LS_4$ ($LS_4C_3$) will again open; and (3) Contact $C_1$ of limit switch $LS_4$ ($LS_4C_1$) will again close, completing a circuit through $LS_3C_1$, $LS_4C_1$, $LS_1C_1$ and $MHR_1S_2$ to energize elevator motor control relay $M_1R$ for initiating operation of elevator motor $M_1$ to raise the rack 12a.

Upon operation of the elevator to raise the rack 12a, the timer shaft 72 together with the drum 75 will again rotate, being operated as previously explained in timed relation with movement of the elevator 18. When the elevator 18 has operated through a distance of one inch, in other words when shelf 25 of rack 12a is in register with unloading conveyor 22:

(1) Knob 25c of drum 75 has moved a proportionate distance from its dotted line position in Figure 2 to a position shown occupied in Figure 2 by knob 24c, and in such position it engages limit switch $LS_1$ to re-open its contact $LS_1C_1$ and re-close its contact $LS_1C_2$. Opening of contact $LS_1C_1$ breaks the circuit to elevator motor control relay $M_1R$ and stops the elevator;

(2) Knob 24b of drum 75 will have moved a similar distance from its position in engagement with limit switch $LS_{20}$ and ride off limit switch $LS_{20}$, allowing $LS_{20}$ to re-close and complete the circuit to loading conveyor motor control relay $M_6R$, whereupon the loading conveyor 20 will again start to operate to bring pans into the proofer chamber; and (3) Knob 24a of drum 75 will have moved a similar distance from its position in engagement with limit switch $LS_2$ and ride off limit switch $LS_2$, allowing contact $LS_2C_1$ to re-close and contact $LS_2C_2$ to re-open.

A cycle of events has now been completed, in other words, shelf 24 has been unloaded, it has been reloaded with pans and the next shelf 25 is in position to be unloaded. The cycle of events is repeated for each shelf of rack 12a and for each shelf of every rack in the system. The timer 71, as previously explaineld, starts each cycle by closing timer switch TS.

In the present specific example, with a full complement of 19 racks in the closed circuit, and with each rack having 7 shelves, there is a total of 133 shelves. Since the timer 71 has been set to unload a shelf every 30 seconds, each shelf of pans of dough will be proofed 66½ minutes, in other words a proofing time of 66½ minutes.

The length of time required in each cycle for the movement of the elevator, movement of the unloading pusher and movement of the loading pusher is considerably less than 30 seconds, so that when a shelf moves into register with the unloading pusher it remains at rest until the timer 71, which is set for 30 seconds, permits the cycle to start, all as above described.

As the elevator moves upwardly from the position in Figures 1 and 2, timer shaft 72 will rotate, as previously described, and an arm 76 carried by shaft 72 momentarily contacts and closes normally open limit switch $LS_8$. Closing of $LS_8$ completes the circuit to lowerator motor control relay $M_8R$, energization of which effects operation of lowerator motor $M_8$. As soon as the lowerator 35 starts, lug and latch means 34 which has held normally closed limit switch $LS_{10}$ open, rides off $LS_{10}$ allowing it to close, thereby maintaining the circuit to lowerator motor control relay $M_8R$ when upon further movement of the elevator, arm 76 rides off and allows limit switch $LS_8$ to re-open.

The lowerator 35 will then, as previously described, carry the rack 12k down to the lower run 14 and then move it to the right, as viewed in Figure 1, pushing all the racks 12t to 12s forward one rack space, so that rack 12k will assume the position shown occupied by rack 12t and rack 12s will move ahead from its full line position to its dot and dash line position, where it is in position to be engaged at the proper time by a lug 33 of the elevator to be carried through the pan unloading and loading station 17.

When the lowerator 35 has moved rack 12k to the position shown occupied by rack 12t, the lug and latch means 34 is disengaged from the rack stub shafts, and engages and opens limit switch $LS_{10}$ breaking the circuit to the lowerator motor control relay $M_8R$ and stopping the lowerator.

Upon further movement of the elevator, it moves rack 12b to the left, as viewed in Figure 1, pushing all the racks 12c to 12j ahead one rack space. When rack 12b reaches the position shown occupied by rack 12c, lug means 33 that has been pushing rack 12b, disengages stub shafts 31. At the same time, rack 12j has been pushed ahead to the position vacated by rack 12k.

When the rack 12a has been raised by the elevator through the loading and unloading station, the lug means 33 will have moved to a position engaging the stub shafts of rack 12s, which at that time will be in its dot and dash position, so that rack 12s is now ready to be moved through the loading and unloading station. The above sequence of events is repeated as each rack reaches the position of rack 12a.

The operation of the proofer has been described with reference to a full complement of racks 12 in the closed loop of the proofer, in other words slow proof time dough, 66½ minutes in our specific example is being delivered to the proofer. At the end of this run, let it be assumed that it is to be followed by a fast proof time dough, for example, a 52½ minute proof time dough. Since, as explained above, a rack goes through the loading and unloading cycle every 3½ minutes, the operator permits four empty racks to follow the last slow proof time dough rack.

These four empty racks are arranged to be automatically moved into the storage chamber 16 when they reach the position shown occupied in Figure 1 by rack 12t, by mechanical means previously described and control means to be described. The fast proof time dough racks will now be speeded through the space vacated by the empty racks in the storage chamber, by the forward conveying means 66 as previously described. However, the racks of fast proof time dough will still travel through the loading and unloading zone in the same 3½ minute period as before, only their travel along the lower run 14 having been accelerated. If instead of a 52½ minute proof time dough, a 56 minute proof time dough is to follow the 66½ minute proof time dough, then only three empty racks are abstracted from the closed loop. Abstracting two racks would provide for a 59½ minute proof time dough, and abstracting one rack would provide for a 63 minute proof time dough. Of course, should the timer 71 be set for a period of time other than 30 seconds, as in our present example, the above proof times would be proportionately changed.

The control means for the forward conveying means 66 to accelerate the travel of racks through the space vacated by the racks that were diverted into the chamber 16, includes a limit switch $LS_9$ in a circuit with motor $M_7$ control relay $M_7R$. Limit switch $LS_9$ is normally closed to energize relay $M_7R$ for operating the forward conveyor motor $M_7$ to move racks along lower run 14. The limit switch $LS_9$ is so located that a rack in the position occupied by rack 12s, shown in dot and dash lines in Figure 1, will contact the switch $LS_9$ holding it open, thereby breaking the circuit to motor $M_7$ control relay $M_7R$ and stopping the conveyor 66. Thus, as soon as a rack is moved by the elevator from the dot and dash position of rack 12s, the limit switch $LS_9$ closes to operate the forward conveyor 66, thus moving the racks through any vacant spaces in lower run 14 until a rack reaches the dot and dash line position of rack 12s, whereby a rack is always in position to be picked up by the elevator.

Figures 6, 7:
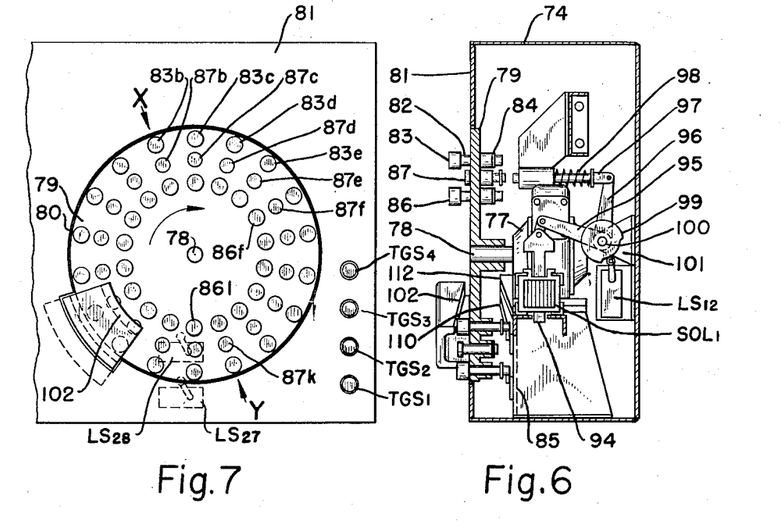
Figure 6 is a sectional view taken on the line 6—6 of Figure 3.
Figure 7 is a fragmentary elevational view of the front of the control box showing the rotatable selector and indicating disc of the control means.

The means controlling the diversion of certain preselected racks 12 from the closed loop into the storage chamber 16 includes a gear reducer 77, as best shown in Figure 3, suitably mounted in the panel box 74, through which, gear reducer shaft 78 is driven from timer shaft 72. Since, as previously stated, shaft 72 is operated by and in timed relation with the elevator 18, it is apparent that shaft 78 is also operated in timed relation with the elevator. A disc 79 is mounted on the shaft 78 for rotation therewith and is disposed in a circular opening 80 in the front wall 81 of the panel box 74, as best shown in Figures 6 and 7.

Extending through and slidably mounted in the disc 79 are a plurality of equidistantly spaced pins 82, arranged in a circle adjacent the periphery of the disc 79. The pins 82, on the obverse side of the disc 79, have knobs 83, limiting movement of the pins in an "in" direction, and on the reverse side of the disc 79, the pins 82 have stops 84, limiting movement of the pins in an "out" direction. The number of such knobs 83 should equal at least the number of racks 12 in the upper run 13 plus the number of knobs covered by the cam 102, the purpose of which cam will be hereinafter described. In the present instance eighteen knobs 83 are disclosed, being more than is necessary so that the same control disc can be used with a proofer having more than the number of racks shown, for purpose of illustration, in the drawings. The gear reduction of the gear reducer 77 is selected so that upon movement of a rack by the elevator 18 from the position of rack 12a to the position of rack 12b, in other words through a complete loading and unloading cycle, the disc 79 turns to move the knobs 83 through one knob space, in other words, from a position occupied by one knob to the position occupied by its adjacent knob.

The disc 79 is provided with an inner circle of knobs 86 and a middle circle of knobs 87, disposed in radial alinement with the outer circle of knobs 83. The knobs 86 and 87 are provided with pins and stops and are slidably mounted in the same manner as knobs 83, described above.

As will be hereinafter described in greater detail, the middle circle of knobs will indicate if a rack, that has passed through the loading and unloading station 17, has at least one pan set on it or if that rack is empty. If the rack has one or more pan sets, the knob 87 corresponding to that rack is automatically pushed from its normal "in" position to its "out" position, and if the rack is empty its corresponding knob 87 will remain in its normal "in" position. The outer circle of knobs 83 are manually operated by the operator to divert empty racks from the closed loop into the storage chamber 16. By pushing a knob 83, in radial alinement with a knob 87 that is in "in" or empty rack indicating position, from its normal "out" position to its "in" position, the corresponding empty rack will upon its arrival in position occupied by rack 12t in Figure 1, be automatically diverted into the storage chamber 16. The inner circle of knobs 86 are manually operated by the operator to re-insert a rack from the storage chamber 16 into the closed loop. By pushing a knob 86, in radial alinement with a knob 87 that is in "in" or empty rack indicating position, a rack is automatically re-inserted from the storage chamber 16 into the closed loop when the empty rack arrives in position occupied by rack 12t in Figure 1. By means hereinafter described, the operator may re-insert one, two, three or four racks into the closed loop.

The disc control means will now be described in detail. A pan coming into the proofing chamber 11 on the loading conveyor 20 engages and depresses a series of arms 88 of a lever 89, as shown in Figure 8, thereby rotating the shaft 90 which is operatively associated with and closes normally open limit switch $LS_5$, see Figure 2. Referring to Figure 9, closing of limit switch $LS_5$ energizes mechanically held relay $MHR_2$, setting it so as to close switch $MHR_2S$. Now, even with a gap between the pan that has depressed lever arm 88 and the next pan, whereupon weight 91 on lever arm 92 of lever 89 rotates the shaft 90 in the opposite direction to re-open limit switch $LS_5$, it will be evident that switch $MHR_2S$ will remain closed until trip $TR_2$ is actuated at the appropriate time, as hereinafter explained, to release the mechanically held relay $MHR_2$.

An arm 93, mounted to rotate with timer shaft 72, is so disposed thereon relative to normally open limit switch $LS_6$, so that when the last shelf of a rack, for example shelf 30 of rack 12a, moves upwardly from its loading position (in register with loading conveyor 20), the arm 93 will engage and close limit switch $LS_6$. With limit switch $LS_6$ closed and with switch $MHR_2S$ closed (this latter switch having been closed because at least one pan had operated switch $LS_5$, as above explained), solenoid $SOL_1$ is energized. Energization of solenoid $SOL_1$, referring to Figure 6, causes its plunger 94 to move down, which in turn, through lever arms 95 and 96, moves selector plunger 97 to its extended position, or to the left as viewed in Figure 6, against the force of spring 98. Extended movement of plunger 97 strikes the pin of one of the middle circle of knobs 87, pushing the knob to its "out" position.

At the same time that plunger 97 moves to push out one of the knobs 87, a cam 99 is rotated in counter-clockwise direction, as viewed in Figure 6. The cam 99 is mounted to rotate with the shaft 100, which shaft is rotatably mounted in bearing bracket 101 and is rotated upon rotation of arms 95 and 96, both of which are secured to the shaft 100. Upon such rotation of cam 99, it engages and closes normally open limit switch $LS_{12}$. Closing of limit switch $LS_{12}$ releases trip $TR_2$, whereupon mechanically held relay $MHR_2$ returns to its former position effecting re-opening of switch $MHR_2S$. Opening of switch $MHR_2S$ breaks the circuit to solenoid $SOL_1$, so that upon de-energization of solenoid $SOL_1$, the spring 98 will move the plunger 97 back to its retracted position.

When the rack 12a is again moved upwardly by elevator 18, arm 93 moves off limit switch $LS_6$, so that $LS_6$ will re-open. This whole series of steps is now ready to be repeated upon arrival of the next rack 12 in the loading position. In the arrangement shown in the drawings, the plunger 97 is located relative to disc 79, so that it will push out the middle knob 87 in line with an indicator arrow X on the front wall 81 of the panel box 74. This middle knob 87 has for convenience been numbered 87b in Figure 7, since it corresponds to a rack that has passed through the unloading and loading zone to the position shown occupied in Figure 1 by rack 12b. Thus, by glancing at the disc 79, and noting that knob 87b is in the "out" position, the operator will know that a rack in the position occupied by rack 12b in Figure 1, has at least one pan on one of its shelves. Similarly, if knob 87c is in the "out" position, the operator knows that a rack in the position shown occupied by rack 12c has pans on it and so forth on around. An indicator arrow Y on the front wall 81 of the panel box corresponds to a rack in the position shown occupied by rack 12k and it follows that if knob 87k is in the "out" position, then rack 12k has pans on it.

If no pans at all had been delivered by the loading conveyor 20 during passage of a rack through the loading zone, then limit switch $LS_5$ would not at any time have been closed to initiate the operation of the plunger 97, so that the middle knob 87 corresponding to that rack would not have been pushed to its "out" position, but would remain in its normal "in" position. Thus by glancing at the disc 79, and noting which knobs are in "in" position and which are in "out" position, the operator will know which of the racks 12b to 12k are empty and which have pans on them.

After passing position Y, any of the knobs 87 that were pushed out, will be pushed back into their normal "in" position by engagement with a cam 102 carried by the cam bracket 85.

When, as previously set forth, it is desired to follow a slow proof time dough, 66½ minutes, with a fast proof time dough, 52½ minutes, the operator permits four empty racks to pass the loading station. The middle set of knobs 87 will, as just described above, indicate the empty racks, that is, they will be in their "in" position. The four empty racks must, as previously explained, be diverted from the closed circuit into the storage chamber 16, this taking place as each empty rack reaches the position shown occupied in Figure 1 by rack 12$t$.

Assume now that racks 12$b$, 12$c$, 12$d$ and 12$e$ are empty. This will be apparent to the operator, since by looking at disc 79, he will observe that knobs 87$b$, 87$c$, 87$d$ and 87$e$ are in their "in" position. Now, by pushing outer knobs 83$b$, 83$c$, 83$d$ and 83$e$, which knobs are in radial alinement respectively with middle knobs 87$b$, 87$c$, 87$d$ and 87$e$, to their "in" position, racks 12$b$, 12$c$, 12$d$ and 12$e$ will automatically be diverted into the chamber 16 when they reach the position shown occupied by rack 12$t$ in Figure 1. The control means for accomplishing this will be hereinafter described in detail. It is evident that since knobs 83 and 87 move ahead in timed relation with the movement of the racks 12, the knobs 87 will indicate the empty racks irrespective of their position along upper run 13, so that the operator may push the corresponding outer knobs 83 to "in" position to divert those racks, no matter where the empty racks may be along upper run 13.

When empty rack 12$e$ reaches the position shown occupied by rack 12$k$ in Figure 1, its corresponding knob 83$e$ will have reached the position shown occupied by knob 83$k$ in Figure 7. Upon movement of the elevator 17 through one rack shelf space, the lowerator 35 is operated to bring empty rack 12$e$ down from the position shown occupied by rack 12$k$ to the position shown occupied by rack 12$t$ in Figure 1. The details of the operation of the lowerator in bringing rack 12$e$ down need not again be described, having been described above in connection with the lowering of rack 12$k$.

Upon a succeeding operation of the elevator through one rack shelf space, an arm 103 on the timer shaft 72, Figure 2, will engage and close normally open limit switch LS$_{18}$; and simultaneously the knob 83$e$, which was as previously stated occupying the position of knob 83$k$ in Figure 7, will engage and close limit switch LS$_{27}$. Closing of limit switches LS$_{18}$ and LS$_{27}$, referring to the electrical diagram, completes through normally closed contact C$_2$ of limit switch LS$_{24}$ (LS$_{24}$C$_2$), the purpose of the latter switch being later described, a circuit to motor M$_9$ control relay M$_9$R$_1$, energization of which effects actuation of reversible motor M$_9$ to operate the diverting conveyor 54 in a counterclockwise direction, as viewed in Figures 1 and 2, whereupon the lug 57 engages empty rack 12$e$, which as before stated is now in the position shown occupied by rack 12$t$, and pushes it along the rails 38 into the chamber 16.

Simultaneously with closing of the circuit, above described, to motor M$_9$ control relay M$_9$R$_1$, a circuit to mechanically held control relay MHR$_3$ is completed, energization of which effects closing of switch MHR$_3$S$_1$ and opening of switch MHR$_3$S$_2$. Upon initial movement of the conveyor 54, the lug 57 disengages normally closed limit switch LS$_{26}$, permitting it to close, whereby a circuit to motor M$_9$ control relay M$_9$R$_1$ is completed through limit switch LS$_{26}$ and switch MHR$_3$S$_1$, so that when limit switches LS$_{18}$ and LS$_{27}$ reopen upon a subsequent movement of the elevator 17, the circuit to motor M$_9$ control relay M$_9$R$_1$ is maintained and conveyor 54 will continue to operate. After the conveyor 54 has moved a rack into chamber 16, the lug 57 will reopen limit switch LS$_{26}$ to stop operation of the conveyor 54.

In the same manner in the present example, each of the succeeding empty racks 12$d$, 12$c$ and 12$b$ are diverted from the closed circuit into the chamber 16, each rack pushing any preceding racks rearwardly into the chamber 16. As the empty racks are pushed rearwardly into the chamber 16, the lead rack 12$c$ engages the lug 65 of rear conveyor 59, moving the conveyor 59 in a clockwise direction. When all four racks are in chamber 16, the lug 65 will be in its dotted line position in Figure 2. Mounted to rotate with the shaft 104 of conveyor 59 is a sprocket 105. A chain 106 is trained around sprocket 105 and a sprocket 107, the latter being fixed on a shaft 108 rotatably mounted in suitable manner in chamber 16. Upon operation of the conveyor 59 as aforesaid moving lug 65 from its full to its dotted line position, a cam 109 secured on shaft 108 rotates in timed relation to successively close limit switches LS$_{21}$, LS$_{22}$, LS$_{23}$ and one contact of limit switch LS$_{24}$ (LS$_{24}$C$_1$). A second, normally closed contact of limit switch LS$_{24}$ (LS$_{24}$C$_2$) is held open by cam 109, so that when there are four empty racks in the chamber 16, the circuit to the motor M$_9$ control relay M$_9$R$_1$ for operating the conveyor 59 will remain open, even though the operator may have inadvertently pushed in five of the knobs 83, thus preventing jamming of the machine by more racks being diverted to the chamber 16 than it can accommodate or is intended to accommodate.

After each knob 83, which was pushed in by the operator to divert an empty rack, passes limit switch LS$_{27}$, its inner end is engaged by the cam 110 on cam bracket 85, thereby pushing the knob back to its "out" position.

Referring to Figure 2, it will be noted that conveyor 54 and conveyor 59 are both operatively connected to motor M$_9$. However, conveyor 59 is connected to motor M$_9$ through the electrically controlled air operated clutch 62, previously referred to, whereby conveyor 59 is power operated only when motor M$_9$ operates in a direction to move conveyor 54 in a clockwise direction to move one or more racks out of the chamber 16.

In our above example, four racks were moved into the chamber 16, in the change over from a slow proof time dough to a fast proof time dough. Now, when a fast proof time dough is to be followed by a slower proof time dough, one or more racks are re-inserted from the chamber 16 into the closed loop. In such change over, one or more empty racks is permitted to follow the last rack of fast proof time dough, there generally being a break between such successive dough batches. By inserting one or more racks into the closed loop after the last rack of fast proof time dough, the change over is accomplished.

The control means for so doing will now be described. As previously described, the middle row of knobs 87 will indicate an empty rack or racks in the upper run 13 by being in the "in" position. Referring to Figure 1, assume that rack 12$g$ is the last rack of fast proof time dough, and rack 12$f$ is empty, middle row knob 87$f$ will then be in "in" position. The operator then pushes in inner row knob 86$f$, which is in radial alinement with knob 87$f$. It will be remembered that at this time, with four racks in chamber 16, limit switches LS$_{21}$, LS$_{22}$, LS$_{23}$ and LS$_{24}$C$_1$ are held closed by cam 109. Referring to Figures 7 and 9, normally open toggle switches TGS$_1$, TGS$_2$, TGS$_3$ and TGS$_4$ are in series respectively with limit switches LS$_{21}$, LS$_{22}$, LS$_{23}$ and LS$_{24}$C$_1$, and by closing the appropriate toggle switch the operator can selectively cause one, two, three or four racks to re-enter the closed circuit.

In the present example, in order to re-introduce four racks, the operator closes toggle switch TGS$_1$. At this time limit switch LS$_{21}$ is closed as explained above, so that a circuit is completed, energizing solenoid SOL$_2$. Energization of solenoid SOL$_2$ effects actuation of the air operated clutch 62 to operatively connect the motor M$_9$ with conveyor 59.

When rack 12$f$ reaches the position shown occupied in Figure 1 by rack 12t, inner row knob 86f will have reached the position shown occupied by knob 86i in Figure 7 and upon the next movement of elevator 17, it will engage and close limit switch $LS_{28}$. Upon such movement of the elevator, arm 103 on timer shaft 72 will simultaneously close normally open limit switch $LS_{18}$, Figure 2. With limit switches $LS_{18}$ and $LS_{28}$ closed, referring to Figure 9, a circuit to motor $M_9$ control relay $M_9R_2$ is completed, energization of which effects actuation of reversible motor $M_9$ to operate the conveyor 59 in a counterclockwise direction and the conveyor 54 in a clockwise direction, as viewed in Figure 2.

Simultaneously with closing of the circuit, above described, to motor $M_9$ control relay $M_9R_2$, a circuit is completed to electrically operated trip $TR_3$, whereupon mechanically held relay $MHR_3$ returns to its former position effecting re-opening of switch $MHR_3S_1$, and re-closing of switch $MHR_3S_2$. Upon initial movement of the conveyor 54, the lug 57 disengages normally closed limit switch $LS_{26}$, permitting it to close, whereby a circuit to motor $M_9$ control relay $M_9R_2$ is completed through limit switch $LS_{26}$ and switch $MHR_3S_2$, so that when limit switches $LS_{18}$ and $LS_{28}$ re-open upon a subsequent movement of the elevator 17, the circuit to motor $M_9$ control relay $M_9R_2$ is maintained and conveyors 54 and 59 will continue to operate.

As the conveyor 59 moves, the lug 65 moves forward from its dotted line position in Figure 2, pushing the racks ahead onto the conveyor 54. At the same time, the cam 109 rotates from its position engaging the limit switches $LS_{21}$, $LS_{22}$, $LS_{23}$ and $LS_{24}C_1$ in a counterclockwise direction successively disengaging these limit switches, as successive racks are pushed onto conveyor 54. When the limit switch $LS_{21}$ is disengaged, which occurs when the last of the racks has been pushed onto conveyor 54, the circuit through $LS_{21}$ and toggle switch $TGS_1$ is broken, thereby de-energizing solenoid $SOL_2$ and effecting disengagement of air operated electrically controlled clutch 62, and thus halting further operation of the conveyor 59. If the operator had desired to re-introduce only three of the four racks back into the closed circuit, he would have closed toggle switch $TGS_2$, and in that event the circuit to solenoid $SOL_2$ to disengage the clutch would be broken upon cam 109 opening limit switch $LS_{22}$.

The conveyor 54 continues to operate after having received the four racks from conveyor 59, the lug 57 pushing the racks back into the closed circuit and then engaging and opening limit switch $LS_{26}$ to break the circuit to motor $M_9$ control relay $M_9R_2$ to stop motor $M_9$.

After the inner knobs 86, which the operator pushed to "in" position to effect re-insertion of empty racks into the closed circuit, pass the limit switch $LS_{28}$, their inner ends are engaged by the cam 112 carried by cam bracket 85, thereby pushing the knobs back to their "out" position.

I claim:

1. In a dough proofer provided with a proofing chamber, means for conducting a series of racks, adapted to support pans of dough to be proofed, in a closed loop through said chamber, means adjacent a section of said closed loop for loading pans of dough to be proofed on said racks, a diverting conveyor adjacent and extending outwardly of said closed loop remote from said loading means engageable with a rack for diverting it from said closed loop, motor means for operating said diverting conveyor, a series of indicator members movable in timed relation with the movement of racks from said loading means to said diverting conveyor, means actuated by pans of dough for conditioning said indicator members to indicate loaded racks passing from said loading means whereby the operator may be continuously apprised of the location of loaded and unloaded racks, a series of selector members alined and movable with said series of indicator members, said selector members being adapted to be manually conditioned, and control means actuated by a conditioned selector member in line with an indicator member indicating an unloaded rack for energizing said motor means to operate said diverting conveyor to divert said unloaded rack from said closed loop, said control means being located with respect to said series of selector members to be actuated by said conditioned selector member when said indicated unloaded rack reaches said diverting conveyor.

2. In a dough proofer provided with a proofing chamber, means for conducting a series of racks, adapted to support pans of dough to be proofed, in a closed loop through said chamber, means adjacent a section of said closed loop for loading pans of dough to be proofed on said racks, a diverting conveyor adjacent and extending outwardly of said closed loop remote from said loading means engageable with a rack for diverting it from said closed loop, motor means for operating said diverting conveyor, a series of indicator members movable in timed relation with the movement of racks from said loading means to said diverting conveyor, said indicator members being arranged in a preset position to indicate unloaded racks and means actuated by pans of dough for moving said indicator members from said preset position to another position to indicate loaded racks passing from said loading means whereby the operator may be continuously apprised of the location of each unloaded rack between said loading means and said diverting conveyor, a series of manually operable selector members aligned and movable with said series of indicator members, and control means actuated by a manually operated selector member which is in line with a preset indicator member for energizing said motor means to operate said diverting conveyor to divert an unloaded rack from said closed loop, said control means being located with respect to said series of selector members to be actuated by said manually operated selector member when said indicated unloaded rack reaches said diverting conveyor.

3. An apparatus in accordance with claim 1 including means to de-energize said motor means after said diverting conveyor has completed a rack diverting transit.

4. An apparatus in accordance with claim 1 including means for returning said conditioned indicator and selector members to their unconditioned state subsequent to actuation of said control means by a conditioned selector member.

5. In a dough proofer provided with a proofing chamber, means for conducting a series of racks, adapted to support pans of dough to be proofed, in a closed loop through said chamber, means adjacent a section of said closed loop for loading pans of dough to be proofed on said racks, a diverting conveyor adjacent and extending outwardly of said closed loop remote from said loading means engageable with a rack for diverting it from said closed loop, a motor for operating said diverting conveyor, control means for energizing said motor, a series of selector members movable as a unit in timed relation with the movement of said racks from said loading means to said diverting conveyor and being individually movable between extended and retracted position, said selector members being manually movable to one of said positions for actuating said control means when the rack corresponding to a selector member manually moved to said one of said positions reaches said diverting conveyor, a series of indicators alined with said series of selector members movable as a unit in fixed relation therewith and being individually movable between extended and retracted position, means actuated by pans of dough for moving respective indicators from one to the other of said positions to indicate loaded racks passing from said loading station, whereby indicators in one position indicate loaded racks and indicators in the other position indicate unloaded racks and whereby upon manually moving a selector member in line with an indicator member indicating an unloaded rack to said one of said positions, said unloaded rack upon reaching said diverting conveying means is automatically diverted from said closed loop.

6. In a dough proofer provided with a proofing chamber, means for conducting a series of racks, adapted to support pans of dough to be proofed, in a closed loop through said chamber, means adjacent a section of said closed loop for loading pans of dough to be proofed on said racks, conveying means adjacent and extending outwardly of said closed loop remote from said loading means engageable with a rack for diverting it from said closed loop, motive means for operating said conveying means, control means for energizing said motive means, a rotatably mounted disc, a plurality of concentric circular rows of equidistantly spaced pins carried by and extending through the plane of said disc, respective pins of respective rows being in radial alinement and being axially movable between extended and retracted position, means for rotating said disc in timed relation with movement of said racks from said loading means to said diverting conveying means for moving said pins through one pin space as said racks move through one rack space, means actuated by pans of dough for moving respective pins of one of said circular rows of pins from retracted to extended position to indicate loaded racks passing from said loading station, whereby pins in extended position indicate loaded racks and pins in retracted position indicate unloaded racks, the pins of another of said circular rows of pins being manually movable to extended position, said last named pins when in extended position being arranged to actuate said control means for energizing said diverting conveying means, said control means being disposed with respect to said disc to be actuated by said last named extended pins when corresponding racks reach said diverting conveying means.

7. An apparatus in accordance with claim 6 including cam means disposed beyond said control means in position to be engaged by pins of said concentric circular rows that are in extended position for returning them to retracted position.

8. In a dough proofer provided with a proofing chamber, means for conducting a series of racks, adapted to support pans of dough to be proofed, in a closed loop through said chamber, means adjacent a section of said closed loop for loading pans of dough to be proofed on said racks, a siding conveyor adjacent and extending outwardly of said closed loop remote from said loading means, said closed loop having a full complement of racks between said loading means and said siding conveyor and less than a full complement of racks between said siding conveyor and said loading means, motor means for operating said siding conveyor in a direction to introduce a rack into said closed loop, a series of indicator members movable in timed relation with the movment of racks from said loading means to said siding conveyor, means actuated by pans of dough for conditioning said indicator members to indicate loaded racks passing from said loading means whereby the operator may be continuously apprised of the location of loaded and unloaded racks, a series of selector members alined and movable with said series of indicator members, said selector members being adapted to be manually conditioned, and control means actuated by a conditioned selector member in line with an indicator member indicating an unloaded rack for energizing said motor means to operate said siding conveyor to introduce a rack into said closed loop, said control means being located with respect to said series of selector members to be actuated by said conditioned selector member when said indicated unloaded rack reaches said siding conveyor.

9. In a dough proofer provided with a proofing chamber, means for conducting a series of racks, adapted to support pans of dough to be proofed, in a closed loop through said chamber, means adjacent a section of said closed loop for loading pans of dough to be proofed on said racks, a siding conveyor adjacent and extending outwardly of said closed loop remote from said loading means, said closed loop having a full complement of racks between said loading means and said siding conveyor and less than a full complement of racks between said siding conveyor and said loading means, motor means for operating said siding conveyor in a direction to introduce a rack into said closed loop, a rotatably mounted disc, a plurality of concentric circular rows of equidistantly spaced pins carried by and extending through the plane of said disc, respective pins of respective rows being in radial alinement and being axially movable between extended and retracted position, means for rotating said disc in timed relation with movement of said racks from said loading means to said siding conveyor for moving said pins through one pin space as said racks move through one rack space, means actuated by pans of dough for moving respective pins of one of said circular rows of pins from retracted to extended position to indicate loaded racks passing from said loading means whereby pins in extended position indicate loaded racks and pins in retracted position indicate unloaded racks, the pins of another of said circular rows of pins being manually movable to extended position, and control means actuated by a manually moved one of said last named circular row of pins in line with one of said first named circular row of pins indicating an unloaded rack for energizing said motor means to operate said siding conveyor to introduce a rack into said closed loop, said control means being located with respect to said disc to be actuated by said manually moved pin when said unloaded rack reaches said siding conveyor.

10. In a dough proofer provided with a proofing chamber, means for conducting a series of racks, adapted to support pans of dough to be proofed, in a closed loop through said chamber, means adjacent a section of said closed loop for loading pans of dough to be proofed on said racks, a siding conveyor adjacent and extending outwardly of said closed loop remote from said loading means, reversible motor means for operating said siding conveyor in one direction for diverting racks from said closed loop and in the opposite direction for introducing racks into said closed loop, a series of indicator members movable in timed relation with the movement of racks from said loading means to said siding conveyor, means actuated by pans of dough for conditioning said indicator members to indicate loaded racks passing from said loading means whereby the operator may be continuously apprised of the location of loaded and unloaded racks, a first and second series of selector members alined and movable with said series of indicator members, said selector members being adapted to be manually conditioned, first control means actuated by a conditioned selector member of said first series of selector members in line with an indicator member indicating an unloaded rack for energizing said reversible motor means to operate said siding conveyor in a direction to divert said unloaded rack from said closed loop, and second control means actuated by a conditioned selector member of said second series of selector members in line with an indicator member indicating an unloaded rack for energizing said reversible motor means to operate said siding conveyor in a direction to insert a rack into said closed loop, said first and second control means being located with respect to said series of first and second selector members respectively, to be actuated by a conditioned selector member when said indicated unloaded rack reaches said siding conveyor.

11. In a dough proofer provided with a proofing chamber, means for conducting a series of racks, adapted to support pans of dough to be proofed, in a closed loop through said chamber, means adjacent a section of said closed loop for loading pans of dough to be proofed on said racks, a siding conveyor adjacent and extending outwardly of said closed loop remote from said loading means, reversible motor means for operating said siding conveyor in one direction for diverting racks from said closed loop and in the opposite direction for introducing racks into said closed loop, a series of indicator members movable as a unit in timed relation with the movement of said racks from said loading means to said siding conveyor for tracing the progress of the racks through said chamber, said indicator means being individually movable between extended and retracted positions, means actuated by pans of dough for moving respective indicators from one to the other of said positions to indicate loaded racks passing from said loading station, whereby indicators in one position indicate loaded racks and indicators in the other position indicate unloaded racks, a first and second series of selector members alined with said series of indicator members and being movable as a unit therewith, said selector members being individually movable manually between extended and retracted position, first control means actuated by a manually moved selector member of said first series of selector members in line with an indicator member indicating an unloaded rack for energizing said reversible motor means to operate said siding conveyor in a direction to divert said unloaded rack from said closed loop, and second control means actuated by a manually moved selector member of said second series of selector members in line with an indicator member indicating an unloaded rack for energizing said reversible motor means to operate said siding conveyor in a direction to introduce a rack into said closed loop following said unloaded rack, said first and second control means being located with respect to said series of first and second selector members respectively, to be actuated by a manually moved selector member when said indicated unloaded rack reaches said siding conveyor.

12. In a dough proofer provided with a proofing chamber, means for conducting a series of racks, adapted to support pans of dough to be proofed, in a closed loop through said chamber, means adjacent a section of said closed loop for loading pans of dough to be proofed on said racks, a siding conveyor adjacent and extending outwardly of said closed loop remote from said loading means, a reversible motor for operating said siding conveyor in opposite directions for selectively diverting a rack from and inserting a rack in said closed loop, a rotatably mounted disc, first and second concentric circular rows of equidistantly spaced selector pins carried by and extending through the plane of said disc, said pins being axially movable between extended and retracted positions, means for rotating said disc in timed relation with movement of said racks from said loading means to said siding conveyor for moving said pins through one pin space as said racks move through one rack space for tracing the progress of racks through said proofing chamber from the loading means to the siding conveyor, first and second control means for respectively actuating said reversing motor in opposite directions for selectively operating said siding conveyor in a direction for diverting racks from and inserting racks in said closed loop, said first and second control means being disposed relative to said disc for energization respectively by an extended selector pin of said respective first and second rows of selector pins when the rack corresponding to such extended selector pin reaches said siding conveyor, a circular row of equidistantly spaced indicator pins concentric with said first and second circular rows of selector pins carried by and extending through the plane of said disc, said indicator pins being axially movable between extended and retracted positions, means actuated by pans of dough for moving respective pins of said circular row of indicator pins from retracted to extended position to indicate loaded racks passing from said loading station, whereby pins in extended position indicate loaded racks and pins in retracted position indicate unloaded racks, in consequence of which movement to extended position of a selector pin of one or the other of said first and second rows in alinement with an indicator pin in extended position causes a rack to be selectively diverted from or inserted in said closed loop when the rack corresponding to said extended indicator pin reaches said siding conveyor.

References Cited in the file of this patent
UNITED STATES PATENTS

| 1,555,692 | Morton | Sept. 29, 1925 |
| 1,940,867 | James et al. | Dec. 26, 1933 |
| 2,217,342 | Ladrach | Oct. 8, 1940 |